(12) United States Patent
Grüger et al.

(10) Patent No.: US 8,324,526 B2
(45) Date of Patent: Dec. 4, 2012

(54) WELDED REPAIR OF DEFECTS LYING ON THE INSIDE OF COMPONENTS

(75) Inventors: Birgit Grüger, Dortmund (DE); Lucian Iordache, Stoney Creek (CA); Ovidiu Timotin, Hamilton (CA)

(73) Assignee: Siemens Aktiengesellschaft, München (DE)

( * ) Notice: Subject to any disclaimer, the term of this patent is extended or adjusted under 35 U.S.C. 154(b) by 674 days.

(21) Appl. No.: 12/526,797

(22) PCT Filed: Feb. 13, 2007

(86) PCT No.: PCT/EP2007/051368
§ 371 (c)(1),
(2), (4) Date: Aug. 12, 2009

(87) PCT Pub. No.: WO2008/098614
PCT Pub. Date: Aug. 21, 2008

(65) Prior Publication Data
US 2010/0116793 A1   May 13, 2010

(51) Int. Cl.
*B23K 35/22* (2006.01)
(52) U.S. Cl. .......... 219/121.63; 219/72; 219/137 R; 219/145.22; 219/146.3; 219/146.32
(58) Field of Classification Search .......... 219/125.1, 219/125.11, 125.12, 137.71, 139, 145.1, 219/146.1, 146.24, 146.41, 173 R, 72, 121.63, 219/136, 137 R, 145.22–145.23, 146.22, 219/146.29, 146.32, 146.52
See application file for complete search history.

(56) References Cited

U.S. PATENT DOCUMENTS

| | | | | |
|---|---|---|---|---|
| 3,581,039 A * | 5/1971 | Kanzaki et al. | ................. | 219/73 |
| 3,594,542 A * | 7/1971 | Nobuaki et al. | ........... | 219/137 R |
| 4,022,442 A * | 5/1977 | Okui | ................. | 266/75 |
| 4,151,389 A * | 4/1979 | Hirsch et al. | ................. | 219/73.1 |
| 4,153,832 A * | 5/1979 | Iio et al. | ................... | 219/124.34 |
| 4,229,643 A * | 10/1980 | Caldwell | ................... | 219/146.24 |
| 4,604,781 A * | 8/1986 | Rankin, III | ................ | 29/402.07 |
| 4,754,118 A * | 6/1988 | Fukaya et al. | ............ | 219/137 R |
| 4,803,340 A * | 2/1989 | Sato et al. | ................. | 219/146.1 |
| 4,948,936 A * | 8/1990 | Landry | ....................... | 219/76.14 |
| 5,474,736 A * | 12/1995 | Araki et al. | ....................... | 419/3 |
| 6,024,792 A | 2/2000 | Kurz et al. | | |
| 6,153,847 A * | 11/2000 | Nakatani et al. | ................. | 219/72 |
| 6,297,472 B1 * | 10/2001 | Bong et al. | ................ | 219/125.12 |
| 6,414,269 B2 * | 7/2002 | Kim | ........................ | 219/145.22 |
| 6,417,489 B1 * | 7/2002 | Blankenship et al. | ... | 219/145.31 |
| 2001/0045420 A1 * | 11/2001 | Bong et al. | .................... | 219/125.1 |
| 2004/0251297 A1 * | 12/2004 | Lamothe et al. | ............. | 228/183 |
| 2005/0006355 A1 * | 1/2005 | De Dinechin et al. | ... | 219/121.63 |
| 2008/0135529 A1 * | 6/2008 | Kuchuk-Yatsenko et al. | ............... | 219/104 |
| 2008/0178734 A1 * | 7/2008 | Butler et al. | ....................... | 95/12 |
| 2009/0039065 A1 * | 2/2009 | Nakamura et al. | ......... | 219/137 R |
| 2009/0294426 A1 * | 12/2009 | Bong | ............................ | 219/136 |
| 2011/0266330 A1 * | 11/2011 | Bruck et al. | ................. | 228/112.1 |

(Continued)

FOREIGN PATENT DOCUMENTS

CH    600980 A5    6/1978

(Continued)

*Primary Examiner* — Michael Lebentritt

(57) ABSTRACT

The repair of cracks according to the state of the art comprises the fact that defects located on the inside must be worked outward in order to be able to be welded closed. The method according to the invention proposes not to work out cracks located on the inside, but to melt the crack located on the inside utilizing a flux agent.

17 Claims, 4 Drawing Sheets

U.S. PATENT DOCUMENTS

2012/0043307 A1 * 2/2012 Lennartsson et al. ..... 219/137 R

FOREIGN PATENT DOCUMENTS

| EP | 0486489 | B1 | | 11/1994 |
| --- | --- | --- | --- | --- |
| EP | 0412397 | B1 | | 3/1998 |
| EP | 0892090 | A | | 1/1999 |
| EP | 0786017 | B1 | | 3/1999 |
| EP | 1306454 | | | 5/2003 |
| EP | 1319729 | A1 | | 6/2003 |
| EP | 1204776 | B1 | | 6/2004 |
| EP | 1584402 | A2 | | 10/2005 |
| JP | 4284975 | A | | 10/1992 |
| JP | 2000135570 | A | * | 5/2000 |
| JP | 2001305271 | A | * | 10/2001 |
| JP | 2003311463 | A | | 11/2003 |
| JP | 2004148456 | A | * | 5/2004 |
| WO | WO 9967435 | A1 | | 12/1999 |
| WO | WO 0044949 | A1 | | 8/2000 |

* cited by examiner

FIG 7

| Material | Chemical composition in % | | | | | | | | | | | | |
|---|---|---|---|---|---|---|---|---|---|---|---|---|---|
| | C | Cr | Ni | Co | Mo | W | Ta | Nb | Al | Ti | B | Zr | Hf |
| Ni-based investment casting alloys- | | | | | | | | | | | | | |
| GTD 222 | 0.10 | 22.5 | Remainder | 19.0 | | 2.0 | 1.0 | | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | 2.9 | 2.9 | 0.006 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <0.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | 0.03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | 1.00 |
| IN 792 DS | 0.08 | 12.5 | Remainder | 9.0 | 1.9 | 4.1 | 4.1 | | 3.4 | 3.8 | 0.015 | 0.02 | |
| MAR M 002 | 0.15 | 9.0 | Remainder | 10.0 | | 10.0 | 2.5 | | 5.5 | 1.5 | 0.015 | 0.05 | 1.50 |
| MAR M 247 LC DS | 0.07 | 8.1 | Remainder | 9.2 | 0.5 | 9.5 | 3.2 | | 5.6 | 0.7 | 0.015 | 0.02 | 1.40 |
| CMSX-2 | <.006 | 8.0 | Remainder | 4.6 | 0.6 | 8.0 | 6.0 | | 5.6 | 1.0 | <.003 | <.0075 | |
| CMSX-3 | <.006 | 8.0 | Remainder | 4.6 | 0.6 | 8.0 | 6.0 | | 5.6 | 1.0 | <.003 | <.0075 | 0.10 |
| CMSX-4 | | 6.0 | Remainder | 10.0 | 0.6 | 6.0 | 6.0 | | 5.6 | 1.0 | | Re=3.0 | 0.10 |
| CMSX-6 | <.015 | 10.0 | Remainder | 5.0 | 3.0 | <.10 | 2.0 | <.10 | 4.9 | 4.8 | <.003 | <.0075 | 0.10 |
| PWA 1480 SX | <.006 | 10.0 | Remainder | 5.0 | | 4.0 | 12.0 | | 5.0 | 1.5 | <.0075 | <.0075 | |
| PWA 1483 SX | 0.07 | 12.2 | Remainder | 9.0 | 1.9 | 3.8 | 5.0 | | 3.6 | 4.2 | 0.0001 | 0.002 | |
| Co-based investment casting alloys- | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Remainder | | 7.5 | 4 | | | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

WELDED REPAIR OF DEFECTS LYING ON THE INSIDE OF COMPONENTS

CROSS REFERENCE TO RELATED APPLICATIONS

This application is the US National Stage of International Application No. PCT/EP2007/051368, filed Feb. 13, 2007 and claims the benefit thereof, which is incorporated by reference herein in its entirety.

FIELD OF THE INVENTION

The invention relates to the welded repair of defects lying on the inside of components.

BACKGROUND OF THE INVENTION

Components are tested in various ways after production or after use, sometimes then finding defects lying on the inside that often have to be repaired.

According to the prior art, material is removed from the crack not only if the crack occurs on the surface but also if it is lying on the inside, i.e. does not go through to the outer surface. Such cracks from which material is removed are then closed by being brazed or welded. This removal of material is time-consuming, since it represents a further working step. In particular, it must be ensured that all the material is removed from the crack.

SUMMARY OF THE INVENTION

It is therefore the object of the invention to provide a method that simplifies the welded repair of defects lying on the inside.

The object is achieved by a method for the welded repair of defects lying on the inside according to the claims.

This method uses a flux which is applied to the surface of the component near the crack and is then welded.

Further advantageous measures, which can be combined with one another as desired to achieve further advantages, are listed in the dependant claims.

BRIEF DESCRIPTION OF THE DRAWINGS

The invention is described in detail with reference to the drawings, in which:

FIG. 6 shows a perspective view of a combustion chamber and
FIG. 7 shows a list of superalloys.

DETAILED DESCRIPTION OF THE INVENTION

Figure 1:
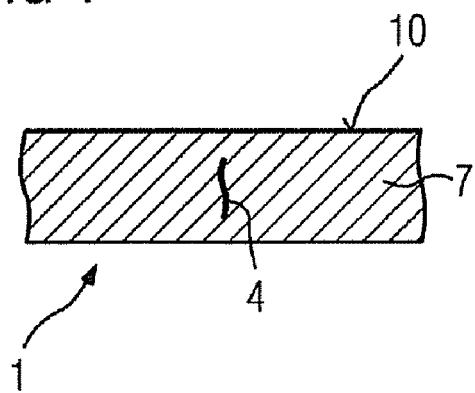
FIGS. 1, 2 and 3 show the procedure involved in the method.

FIG. 1 shows a component 1, 120, 130, 155, which has in the substrate 7 a crack 4 that does not extend as far as the outer surface 10, that is to say is completely enclosed in the substrate 7 of the component 1, 120, 130, 155.

In particular in the case of turbine components, the material of the substrate 7 is preferably a nickel- or cobalt-based alloy. Examples of nickel- or cobalt-based alloys that are used can be found in FIG. 7. Similarly, the method can be used for steels (for stainless high-grade steels, e.g. SS410) and for parts of a compressor or for guiding grooves.

Figure 2:
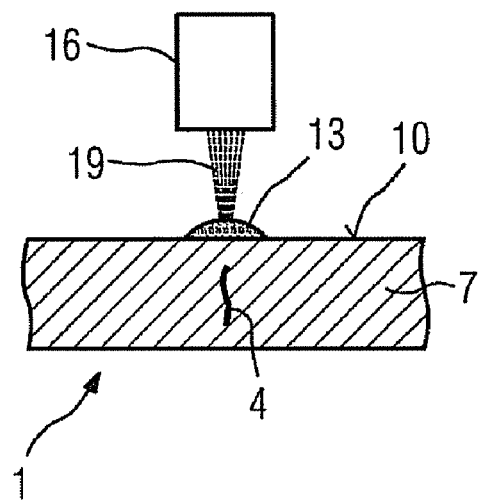

An arrangement for repairing the crack 4 as shown in FIG. 1 is schematically shown in FIG. 2. Cracks 4 lying on the inside are detected, preferably by means of an eddy current method 5.

Then an "active" flux 13, known from the prior art, is applied to the surface 10 in the region above the crack 4. The flux 13 is preferably in the form of a powder. The flux 13 preferably consists of powder.

The flux 13 may preferably also be applied by being brushed or sprayed on as a suspension, or as an alcohol- or water-based slurry, with or without a binder. Similarly preferably, the powder may be in a pressed form, that is to say as a strip or sheet. Fine-grained powder (+1 µm/−45 µm) is preferably used for the filler.

For welding, fusion welding methods and/or plasma welding methods are preferably used:
manual arc welding
metal arc welding with a flux-cored wire electrode and no shielding gas;
submerged-arc welding with a wire electrode,
submerged-arc welding with a flux-cored wire electrode,
metal inert gas welding (MIG welding),
metal active gas welding (MAG welding),
tungsten inert gas welding (TIG welding),
gas welding with an oxyacetylene flame.

TIG welding is used with preference. Similarly, other methods such as laser welding or electron-beam welding may also be used.

Figure 3:
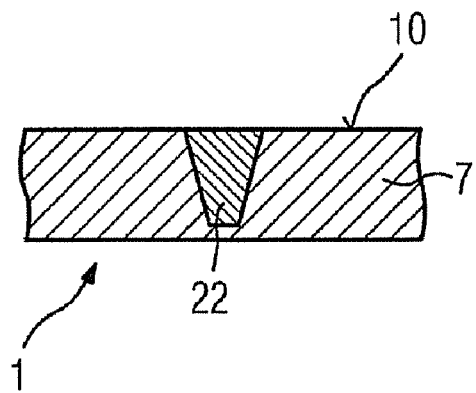

By means of a welding device 16 (TIG welding device, laser welding device, etc.), which produces a plasma 19 or emits laser beams 19, the flux 13 is melted and the region around the crack 4 is completely encompassed, with the result that around the crack 4 there forms a melting zone 22, which may be up to 8 mm deep (=depth of the molten pool), as shown in FIG. 3. A person skilled in the art can set laser parameters (duration, intensity, power, . . . ) material-specifically and component-specifically, in order to encompass a crack 4 completely in a melting zone 22.

In FIG. 3, the melting zone does not extend through the entire thickness of the component 7. Similarly, particularly in the case of hollow or thin-walled components, the melting zone 22 may preferably extend over the entire thickness. Further welding is not necessary. The worked location is preferably also reworked.

A flux from the prior art may be chosen for the flux 13. The flux 13 is preferably a powder. Similarly preferably, the flux 13 may be a powder mixture. A composition of $SiO_2$ or $Fe_2O_3$ may preferably be used. Similarly preferably, a composition of titanium oxide (0-60% by weight), nickel oxide (0-40% by weight) and magnesium silicide (0-10% by weight) can be used.

The combinations:
titanium oxide
nickel oxide
manganese silicide
titanium oxide/nickel oxide
titanium oxide/manganese silicide
nickel oxide/manganese silicide
titanium oxide/nickel oxide/manganese silicide
are respectively preferred exemplary embodiments.

The much improved depth of the molten pool when cracks are laser welded and remelted with such an "active" flux 13 or surface-active suspensions, as they are known, is influenced by the following factors:

a: Marangoni effect: the energy and heat transfer during the welding/remelting takes place by movement of liquid metal in the molten pool. If the movements on the surface of the molten pool are outwardly directed, the molten pool becomes wide and shallow. An inwardly directed movement makes the molten pool become narrow and deep. The kind of movement in the molten pool is influenced by the surface tension of the liquid metal. By deliberately adding surface-active substances (filler), it is possible to change the surface tension in the molten pool in such a way that the movement of the liquid metal is inwardly directed, and consequently a much improved depth of the molten pool is achieved.

b: Improved absorption of the welding beam: the surface-active substance is remelted in the course of the welding process and forms a very thin layer (slag) on the surface of the molten pool. This thin layer not only influences the surface tension of the molten pool but also at the same time has much improved properties in terms of absorption of the welding beam in comparison with the liquid metal of the base material. It is consequently possible to produce an improved energy transfer and depth of the molten pool, which under certain circumstances can reach up to 4-8 mm.

The improved energy transfer in the case of TIG welding/remelting with surface-active substances is achieved by an enrichment of the arc with electrons. This enrichment has the effect of constricting the arc, and consequently producing a much higher energy density and improved depth of the molten pool.

Figure 4:
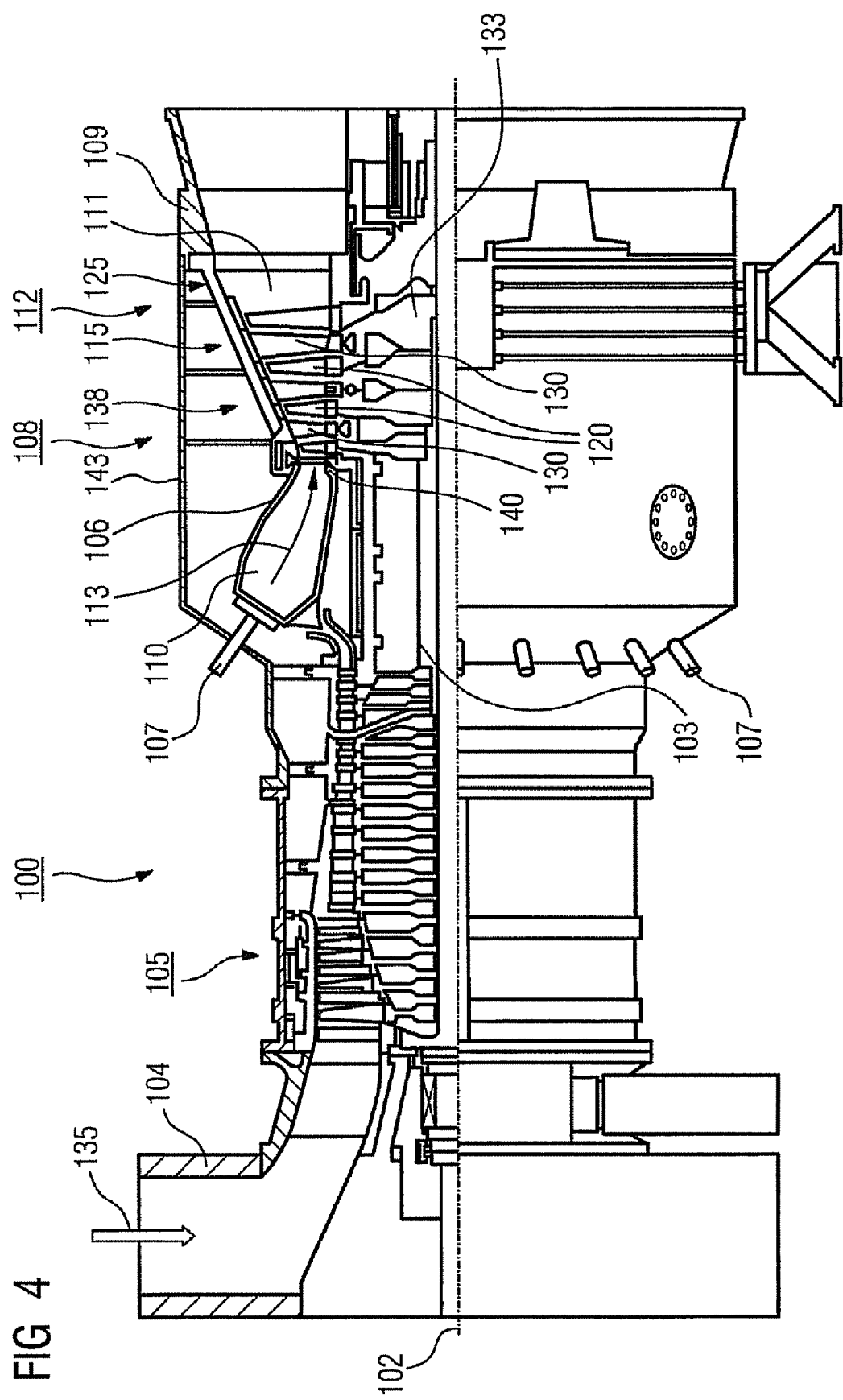
FIG. 4 shows a gas turbine.

FIG. 4 shows by way of example a gas turbine 100 in a longitudinal partial section.

The gas turbine 100 has in the interior a rotor 103 with a shaft 101, which is rotatably mounted about an axis of rotation 102 and is also referred to as a turbine runner. Following one another along the rotor 103 are an intake housing 104, a compressor 105, a combustion chamber 110, for example of a toroidal form, in particular an annular combustion chamber, with a number of coaxially arranged burners 107, a turbine 108 and the exhaust housing 109.

The annular combustion chamber 110 communicates with a hot gas duct 111, for example of an annular form. There, the turbine 108 is formed for example by four successive turbine stages 112.

Each turbine stage 112 is formed for example by two blade rings. As seen in the direction of flow of a working medium 113, a row of stationary blades 115 is followed in the hot gas duct 111 by a row 125 formed by moving blades 120.

The stationary blades 130 are in this case fastened to an inner housing 138 of a stator 143, whereas the moving blades 120 of a row 125 are attached to the rotor 103, for example by means of a turbine disk 133. Coupled to the rotor 103 is a generator or a machine (not presented).

During the operation of the gas turbine 100, air 135 is sucked in by the compressor 105 through the intake housing 104 and compressed. The compressed air provided at the end of the compressor 105 on the turbine side is passed to the burners 107 and mixed there with a fuel. The mixture is then burned in the combustion chamber 110 to form the working medium 113. From there, the working medium 113 flows along the hot gas duct 111 past the stationary blades 130 and the moving blades 120. At the moving blades 120, the working medium 113 expands, transferring momentum, so that the moving blades 120 drive the rotor 103 and the latter drives the machine coupled to it.

The components that are exposed to the hot working medium 113 are subjected to thermal loads during the operation of the gas turbine 100. The stationary blades 130 and moving blades 120 of the first turbine stage 112, as seen in the direction of flow of the working medium 113, are thermally loaded the most, along with the heat shielding elements lining the annular combustion chamber 110.

In order to withstand the temperatures prevailing there, these may be cooled by means of a coolant. Similarly, substrates of the components may have a directional structure, i.e. they are monocrystalline (SX structure) or only have longitudinally directed grains (DS structure).

Iron-, nickel- or cobalt-based superalloys are used for example as the material for the components, in particular for the turbine blade 120, 130 and components of the combustion chamber 110.

Such superalloys are known, for example, from EP 1 204 776 B1, EP 1 306 454, EP 1 319 729 A1, WO 99/67435 or WO 00/44949; these documents constitute part of the disclosure with respect to the chemical composition of the alloys.

The stationary blade 130 has a stationary blade root (not represented here), facing the inner housing 138 of the turbine 108, and a stationary blade head, at the opposite end from the stationary blade root. The stationary blade head faces the rotor 103 and is fixed to a fastening ring 140 of the stator 143.

Figure 5:
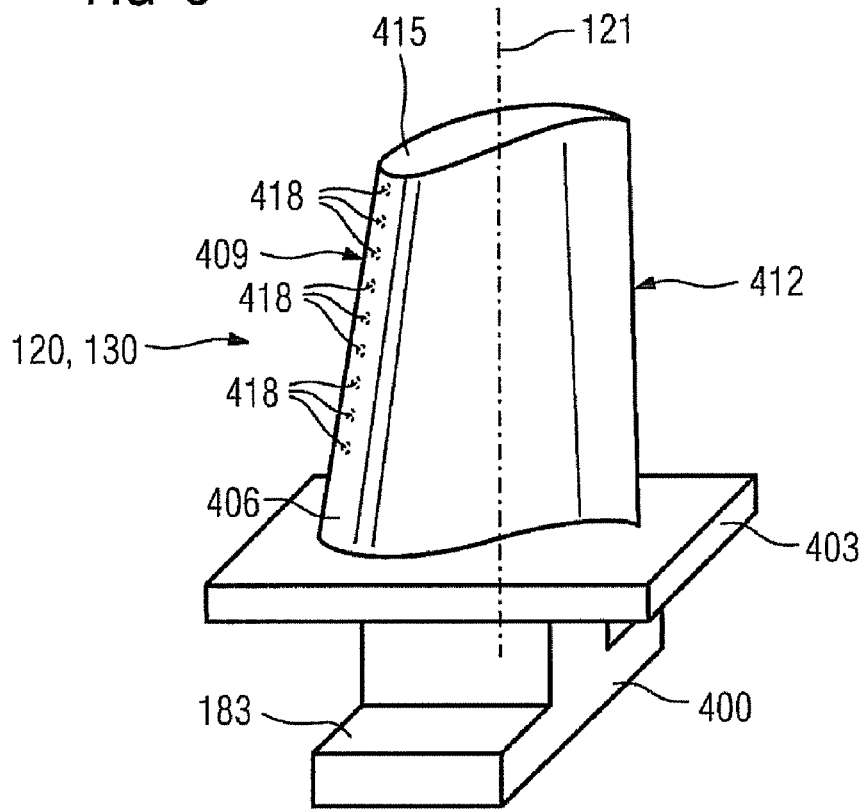
FIG. 5 shows a perspective view of a turbine blade.

FIG. 5 shows in a perspective view a moving blade 120 or stationary blade 130 of a turbomachine, which extends along a longitudinal axis 121.

The turbomachine may be a gas turbine of an aircraft or of a power plant for generating electricity, a steam turbine or a compressor.

The blade 120, 130 has, following one after the other along the longitudinal axis 121, a fastening region 400, an adjoining blade platform 403 and also a blade airfoil 406 and a blade tip 415.

As a stationary blade 130, the blade 130 may have a further platform at its blade tip 415 (not represented).

In the fastening region 400 there is formed a blade root 183, which serves for the fastening of the moving blade 120 to a shaft or a disk (not represented).

The blade root 183 is designed for example as a hammer head. Other designs as a firtree or dovetail root are possible.

The blade 120, 130 has for a medium which flows past the blade airfoil 406 a leading edge 409 and a trailing edge 412.

In the case of conventional blades 120, 130, solid metallic materials, in particular superalloys, are used for example in all the regions 400, 403, 406 of the blade 120, 130.

Such superalloys are known, for example, from EP 1 204 776 B1, EP 1 306 454, EP 1 319 729 A1, WO 99/67435 or WO 00/44949; these documents constitute part of the disclosure with respect to the chemical composition of the alloy.

The blade 120, 130 may in this case be produced by a casting method, also by means of directional solidification, by a forging method, by a milling method or combinations of these.

Workpieces with a monocrystalline structure or structures are used as components for machines which are exposed to high mechanical, thermal and/or chemical loads during operation. The production of monocrystalline workpieces of this type takes place for example by directional solidification from the melt. This involves casting methods in which the liquid metallic alloy solidifies to form the monocrystalline structure, i.e. to form the monocrystalline workpiece, or in a directional manner. Dentritic crystals are thereby oriented along the thermal flow and form either a columnar grain structure (i.e. grains which extend over the entire length of the workpiece and are commonly referred to here as directionally solidified) or a monocrystalline structure, i.e. the entire workpiece comprises a single crystal. In these methods, the transition to globulitic (polycrystalline) solidification must be avoided, since undirected growth necessarily causes the formation of transversal and longitudinal grain boundaries, which nullify the good properties of the directionally solidified or monocrystalline component.

While reference is being made generally to solidified structures, this is intended to mean both monocrystals, which have no grain boundaries or at most small-angle grain boundaries, and columnar crystal structures, which indeed have grain boundaries extending in the longitudinal direction but no transversal grain boundaries. These second-mentioned crystalline structures are also referred to as directionally solidified structures.

Such methods are known from U.S. Pat. No. 6,024,792 and EP 0 892 090 A1; these documents constitute part of the disclosure with respect to the solidification method.

Similarly, the blades 120, 130 may have coatings against corrosion or oxidation (MCrAlX; M is at least one element of the group comprising iron (Fe), cobalt (Co) and nickel (Ni), X is an active element and represents yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1, which are intended to constitute part of this disclosure with respect to the chemical composition of the alloy.

The density is preferably 95% of the theoretical density. A protective aluminum oxide layer (TGO=thermal grown oxide layer) forms on the MCrAlX layer (as an intermediate layer or as the outermost layer).

The composition of the layer preferably comprises Co-30Ni-28Cr-8Al-0.6Y-0.7Si or Co-28Ni-24Cr-10Al-0.6Y. Apart from these cobalt-based protective coatings, nickel-based protective coatings are also preferably used, such as Ni-10Cr-12Al-0.6Y-3Re or Ni-12Co-21Cr-11Al-0.4Y-2Re or Ni-25Co-17Cr-10Al-0.4Y-1.5Re.

A thermal barrier coating which is preferably the outermost layer and consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

The thermal barrier coating covers the entire MCrAlX layer. Columnar grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance. The thermal barrier coating is therefore preferably more porous than the MCrAlX layer.

The blade 120, 130 may be hollow or be of a solid form. If the blade 120, 130 is to be cooled, it is hollow and may also have film cooling holes 418 (indicated by dashed lines).

Figure 6:
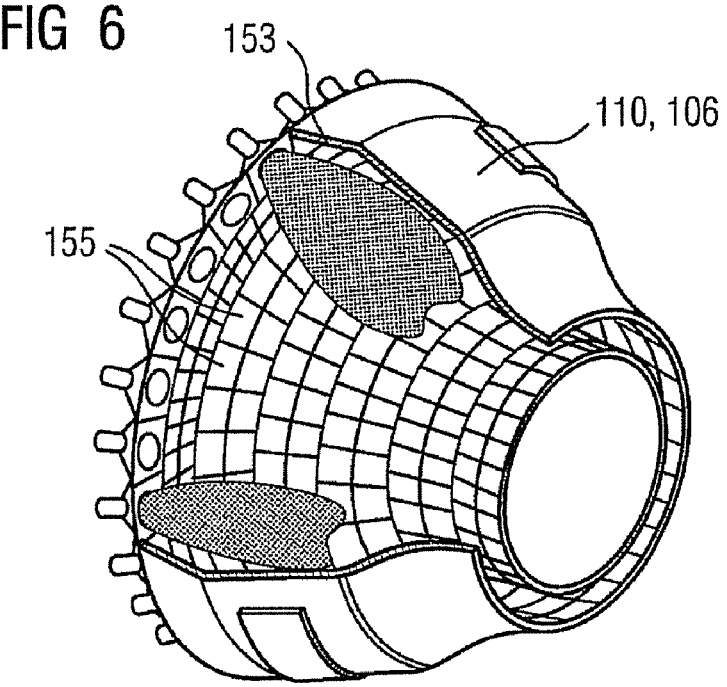

FIG. 6 shows a combustion chamber 110 of the gas turbine 100. The combustion chamber 110 is designed for example as what is known as an annular combustion chamber, in which a multiplicity of burners 107, which produce flames 156 and are arranged in the circumferential direction around an axis of rotation 102, open out into a common combustion chamber space 154. For this purpose, the combustion chamber 110 is designed as a whole as an annular structure, which is positioned around the axis of rotation 102.

To achieve a comparatively high efficiency, the combustion chamber 110 is designed for a comparatively high temperature of the working medium M of approximately 1000° C. to 1600° C. To permit a comparatively long operating time even with these operating parameters that are unfavorable for the materials, the combustion chamber wall 153 is provided on its side facing the working medium M with an inner lining formed by heat shielding elements 155.

On account of the high temperatures in the interior of the combustion chamber 110, a cooling system may also be provided for the heat shielding elements 155 or for their holding elements. The heat shielding elements 155 are for example hollow and, if need be, also have cooling holes (not represented) opening out into the combustion chamber space 154.

Each heat shielding element 155 of an alloy is provided on the working medium side with a particularly heat-resistant protective layer (MCrAlX layer and/or ceramic coating) or is produced from material that is resistant to high temperature (solid ceramic bricks).

These protective layers may be similar to the turbine blades, meaning for example MCrAlX: M is at least one element of the group comprising iron (Fe), cobalt (Co) and nickel (Ni), X is an active element and represents yttrium (Y) and/or silicon and/or at least one element of the rare earths, or hafnium (Hf). Such alloys are known from EP 0 486 489 B1, EP 0 786 017 B1, EP 0 412 397 B1 or EP 1 306 454 A1, which are intended to constitute part of this disclosure with respect to the chemical composition of the alloy.

A thermal barrier coating which is for example a ceramic thermal barrier coating and consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

Columnar grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance.

Refurbishment means that turbine blades 120, 130 and heat shielding elements 155 may have to be freed of protective layers after use (for example by sandblasting). This is followed by removal of the corrosion and/or oxidation layers or products. If need be, cracks in the turbine blade 120, 130 or the heat shielding element 155 are then also repaired. This is followed by recoating of the turbine blades 120, 130 or heat shielding elements 155 and renewed use of the turbine blades 120, 130 or the heat shielding elements 155.

The invention claimed is:

1. A method for repairing a crack lying on an inside of a component by welding, comprising:
   applying a flux as a powder mixture to an outer surface of the component above the crack of the component; and
   melting the flux in a region around the crack lying on the inside of the component by a welding device,
   wherein the crack is completely encompassed by a melting zone during the welding, and
   wherein the crack lies completely on the inside of the component such that the crack does not extend to the outer surface of the component but is completely enclosed in a substrate of the component.

2. The method as claimed in claim 1, wherein a fusion welding method is used.

3. The method as claimed in claim 1, wherein a plasma welding method is used.

4. The method as claimed in claim 1, wherein a laser-beam welding method is used.

5. The method as claimed in claim 1, wherein an electron-beam welding method is used.

6. The method as claimed in claim 1, wherein the powder mixture is in a slurry.

7. The method as claimed in claim 1, wherein the powder mixture is in a suspension.

8. The method as claimed in claim 1, wherein the powder mixture comprises a binder.

9. The method as claimed in claim 1, wherein the powder mixture does not contain a binder.

10. The method as claimed in claim 1, wherein the flux is pressed.

11. The method as claimed in claim 10, wherein the flux is pressed as a sheet.

12. The method as claimed in claim 1, wherein the powder mixture comprises titanium oxide.

13. The method as claimed in claim 12, wherein the powder mixture consists of titanium oxide.

14. The method as claimed in claim 1, wherein the powder mixture comprises nickel oxide.

15. The method as claimed in claim 14, wherein the powder mixture consists of nickel oxide.

16. The method as claimed in claim 1, wherein the powder mixture comprises manganese silicide.

17. The method as claimed in claim 16, wherein the powder mixture consists of manganese silicide.

* * * * *